2,840,447
PROCESS FOR PREPARING FILAMENTS FROM DISPERSIONS CONTAINING GRAFT POLYMERS OBTAINED FROM ETHYLENICALLY UNSATURATED MONOMERS

Duane L. Green, Potsdam, N. Y., assignor to E. I. du Pont de Nemours and Company, Wilmington, Del., a corporation of Delaware No Drawing. Application April 28, 1954
Serial No. 426,281

7 Claims. (Cl. 18—54)

This invention relates to a process for bonding vinyl copolymers together. More specifically, it relates to a process for preparing dispersions of bonded copolymers and shaping these dispersions to produce fibers and films.

The preparation of copolymers by two-stage or multi-stage processes involves the addition of a second monomer at some stage during the polymerization of a first monomer—that is, while the first monomer is still polymerizing. Polymerization is continued to produce a copolymer. It has been noted that copolymers prepared in this manner have properties which differ from those of the usual random copolymer prepared in a one-stage process which involves adding all of the monomers together at the beginning of the polymerization. In the prior two-stage processes a non-uniform product contaminated with homopolymers of each of the monomers has usually been obtained.

Accordingly, it is an object of this invention to prepare non-random or graft copolymers which are substantially free of any homopolymer. Another object of this invention is the preparation of shaped articles, such as filaments, fibers, and films, directly from these dispersions without melting or dissolving the polymers prior to extrusion.

These objects are accomplished by carrying out the polmerization under conditions such that a stable dispersion is maintained after addition of the final monomer. The polymerization of the successive monomer, such as the second or final monomer, is made to occur only after the polymerization of previously added monomers is substantially complete but while the polymer prepared from the first or the previous monomers is still polymerizable. A matrix-forming material is added to the dispersion. The modified dispersion is extruded into a setting medium which gels or precipitates the matrix and immobilizes the particles of the graft copolymer. This gel fiber is then passed through a region where it is subjected to conditions suitable for coalescing the polymer constituent which is to contribute most to the tensile properties of the final shaped article.

The invention can be readily understood by reference to the following examples. These examples serve merely to illustrate the invention and are not intended to limit it in any manner. Unless otherwise specified, all processes are carried out at room temperature (approximately 25° C.) and all parts and percentages are by weight. As can be seen, the copolymers of this invention have properties which are quite distinct from those of a random copolymer of the same composition. The method which is used for preparing the bonded copolymers of this invention has led to a different system for designating these copolymers to indicate their unique preparation and properties. The first and second monomer compositions are written in that order with an arrow placed between them pointing from the second component back toward the first, showing that the second component has been grafted onto the first. The composition of the graft copolymer is given in parenthesis after the second constituent, the weight percentage of each composition being designated and separated by a colon. If either or both of the graft copolymer components is a copolymer, this is indicated by naming both, or all, of the components and separating them by a diagonal line. The weight ratio of the components in this copolymer are indicated by a numerical prefix given in the same order and the numbers are also separated by a diagonal line.

Fiber stick temperature is also referred to in the examples. This is the temperature at which the fiber will just stick to a heated brass block after it has been pressed against the block for five seconds with a 200 gram weight.

Example I

Three hundred twenty parts of water, two parts of a poly (propylene oxide) with poly (ethylene oxide) glycol ends (such as sold under the trade name Pluronic F–68), and two parts of sodium "Lorol" sulfate ("Lorol" is the trade-name for the mixture of aliphatic alcohols obtained by hydrogenation of coconut oil) were charged to a three-necked flask equipped with a stirrer, condenser and nitrogen inlet tube. The flask was purged with nitrogen, and 0.4 part of ammonium persulfate and 0.2 part of sodium metabisulfite were added. The above mixture was heated to 40° C. and 30 parts of vinyl acetate was added to the well-stirred solution. Polymerization of the vinyl acetate appeared to be complete at the end of about 5.5 hours, and 50 parts of acrylonitrile was then added, and polymerization was continued for an additional sixteen hours. A portion of the polymer was coagulated, filtered, washed and dried. The dried polymer had the following properties: intrinsic viscosity, [η] (in dimethylformamide), =5.21, % N=16.17%, moisture=0.32%.

From the nitrogen analysis it was calculated that the copolymer was derived from vinyl acetate to the extent of 39% and of acrylonitrile to the extent of 61%. A portion of the polymer was placed in a Soxhlet apparatus and extracted with acetone for 24 hours. The loss in weight of the polymer was negligible. From this it was concluded that a copolymer had been formed which was substantially free of polyvinyl acetate homopolymer, since that polymer is very soluble in acetone and would have dissolved in the extraction process.

Example II

A spin mix was prepared by mixing 25 ml. of the dispersion of Example I with 25 ml. of a 1% aqueous solution of sodium alginate. The spin mix was filtered through a sand pack and extruded through a 0.004", one-hole spinneret under a pressure of 4.5 to 5.0 p. s. i. The spin mix was extruded into a 2% solution of calcium thiocyanate. This precipitated the sodium alginate as calcium alginate, which served as the matrix for the gel fiber. The gel fiber was then dragged over a weir into a bath containing a 56% aqueous calcium thiocyanate solution heated to 85° C. The polymer particles coalesced in this bath to produce a monofilament of the polyvinyl acetate-polyacrylonitrile bonded copolymer. This was passed into a bath of ice water and washed. These filaments were then drawn 14× at 165° C. After being boiled off and conditioned, they had the following average properties: tenacity=5.3 grams per denier, elongation=20%, initial modulus=53 grams per denier and denier=2.9. These tensile properties are comparable to those of filaments prepared from acrylonitrile homopolymer in the same manner. However, the copolymer could be dyed much more readily with dispersed acetate dyes.

Example III

One hundred sixty parts of water and two parts of Pluronic F–68 were charged to a three-necked flask equipped with a stirrer, condenser, and nitrogen inlet tube. The flask was purged with nitrogen, and 0.2 part of ammonium persulfate and 0.1 part of sodium metabisulfite was added. The mixture was heated to 40° C. Fifteen parts of vinyl acetate was added to the well-stirred solution and polymerized to apparent completion in 2.75 hours at 40° C. Fifteen parts of acrylonitrile was then added and polymerization continued at the same temperature for 3.25 hours. Measurement of the solids content of an aliquot of the stable dispersion obtained indicated that overall conversion to polymer was essentially quantitative. After being precipitated, washed and dried, the polymer was found to be insoluble in acetone, swollen by chloroform and benzene and soluble in dimethylformamide. The instrinsic viscosity in dimethylformamide was 4.2. The polymer contained 12.72% nitrogen. From this the compositon was calculated to be derived from vinyl acetate to an extent of 50% and from acrylonitrile to an extent of 50%.

*Example IV*

Water was removed from the dispersion of Example III under reduced pressure and the concentrated dispersion filtered. The filtrate contained approximately 20% of the copolymer. This dispersion was mixed with equal volumes of a 1% solution of sodium alginate. The dispersion was filtered through a sand pack and extruded from a spinneret under 3.25 p. s. i. pressure into a 2% aqueous solution of calcium thiocyanate. After one foot of travel in this bath the gel filament was transferred to a 56% aqueous solution of calcium thiocyanate heated to 89° C. After three feet of travel in this bath the filament was carried into an ice water wash bath. After one foot of travel in this bath the filament was wound up at 26' per minute. The filament was subsequently drawn at 165° C. to fourteen times its original length. The drawn fiber had the following properties: tenacity=4.68 grams per denier, elongation=10.2%, initial modulus=73.7 grams per denier and denier=3.5.

The filaments prepared from the graft copolymer were found to have a fiber stick temperature of 166° C. Filaments prepared in the same manner from a 50:50 mixture of polyvinyl acetate and polyacrylonitrile were found to have fiber stick temperatures of only 94° C.

*Example V*

A vinyl acetate←acrylonitrile graft copolymer was prepared in a manner similar to that described in Examples I and III. The final polymer contained 30% polyvinyl acetate and 70% polyacrylonitrile bound together. The dispersion was concentrated and mixed with an equal volume of a 1% solution of sodium alginate. This modified dispersion was filtered through a sand pack and extruded through an .008" one-hole spinneret under a pressure of 6 p. s. i. The matrix was formed in a 2% aqueous solution of calcium thiocyanate. After one foot of travel through this bath the polymer particles in the gel fiber were coalesced in a 56% aqueous solution of calcium thiocyanate heated to 90° C. Coalescence was complete after three feet of travel in this bath and the coalesced filament was washed by passing through two feet of ice water. It was wound up at five yards per minute.

The partially dried filaments were drawn over a bar heated to 165° C. The properties at various draw ratios are tabulated below.

| Draw Ratio | Tenacity (g./d.) | Elongation (percent) | Initial Modulus (g./d.) | Denier |
|---|---|---|---|---|
| 4X | 1.6 | 15 | 48 | 22 |
| 8X | 3.3 | 15 | 56 | 6.7 |
| 14X | 5.2 | 15 | 65 | 2.3 |

Filaments prepared from this copolymer were found to have a fiber stick temperature of 195° C. A filament prepared under similar conditions from a 30:70 mechanical mixture of polyvinyl acetate and polyacrylonitrile was found to have a fiber stick temperature of 160° C.

*Example VI*

A polyvinyl acetate←polyacrylonitrile copolymer containing 45% vinyl acetate and 55% acrylonitrile was prepared in a manner similar to that described in Examples I and III. The polymer had an inherent viscosity in dimethylformamide of 4.2 and was insoluble in acetone. The stable dispersion of copolymer which was obtained contained about 20% solids.

Fifty ml. of this dispersion was mixed with 50 ml. of a 1% solution of sodium alginate. The modified dispersion was filtered through a sand pack and extruded from an 8 mil, one-hole spinneret under a pressure of 7 p. s. i.

In one experiment the dispersion was extruded into a coagulating bath containing 2% aqueous calcium thiocyanate. After one foot of travel in this bath the gel fiber was transferred to a coalescing bath containing 56% aqueous calcium thiocyanate heated to 90° C. After three feet of travel in this bath the coalesced fiber was washed in ice water and wound up at 12' per minute. The filaments were partially dried and drawn 10X at 150° C. The drawn filaments were found to have shrunk 11% after being immersed for five minutes in boiling water. After being boiled off and conditioned the filaments had the following properties: tenacity=3.2 grams per denier, elongation=19%, initial modulus=40 grams per denier and denier=5.4.

In a separate experiment the matrix was formed as before, but the polymer particles were coalesced in dimethylformamide heated to 90° C. These filaments were washed, partially dried and drawn 10X by passing over a bar heated to 165° C. The drawn yarn shrank about 5% after being immersed in boiling water for five minutes. After boil-off the yarn was dried and conditioned and found to have the following properties: tenacity= 3.0 grams per denier, elongation=17%, initial modulus=47 grams per denier and denier=7.

*Example VII*

Two hundred parts of water, 0.75 part of sodium "Lorol" sulfate, and 0.75 part of Pluronic F–68 were charged to the reactor. The reactor was purged with nitrogen, and 0.10 part of ammonium persulfate and 0.05 part of sodium metabisulfite were added. This mixture was heated to 40° C. and 20 parts of beta-methoxyethyl acrylate was added. One hour later 30 parts of acrylonitrile was added. Heating was discontinued after approximately two more hours and the polymer dispersion filtered. The filtrate contained approximately 20% solids. A portion of the polymer was isolated, washed, and dried. Analysis of this polymer showed a moisture content of 0.29% and a nitrogen content of 14.81%. The polymer contained 40% poly (beta-methoxyethyl acrylate) and 60% polyacrylonitrile bonded directly to each other.

*Example VIII*

Fifty ml. of the filtered dispersion from Example VII was mixed with 50 ml. of a 1% aqueous solution of sodium alginate. The modified dispersion was filtered through a sand pack and extruded through a 4 mil, one-hole spinneret under a pressure of p p. s. i. The sodium alignate in the extruded dispersion was coagulated in a 2% aqueous solution of calcium thiocyanate. After one foot of travel through this bath the gel fiber was conducted over a weir into a bath containing a 56% aqueous solution of calcium thiocyanate heated to 90° C., which coalesced the polymer particles. After traveling for three feet through this bath, the coalesced filament was washed in ice water and wound on a bobbin at a rate of 18' per minute. The partially dried filaments were drawn to approximately ten times their original length over a bar heated to 165° C. The drawn filaments were boiled off, dried and conditioned. They had the following properties: tenacity=2.3 grams per denier, elongation=29%, initial modulus=22 grams per denier and denier=8.

The drawn filaments were found to have shrunk only 15% after being immersed for five minutes in boiling water. This represents excellent form stability for an acrylate copolymer containing this much acrylate.

*Example IX*

Four hundred parts of water, 1.5 parts of sodium "Lorol" sulfate, and 1.5 parts of Pluronic F-68 were charged to the reactor. The reactor was purged with nitrogen, and 0.2 part of ammonium persulfate and 0.1 part of sodium metabisulfite were added. This mixture was heated to 40° C. with stirring. An 80/20 copolymer was prepared by adding 40 parts of beta-methoxyethyl acrylate and 10 parts of acrylonitrile and polymerizing at 40° C. Polymerization was found to be ready for the second component in two hours and after that time fifty parts of acrylonitrile was added and polymerization was continued for approximately two more hours at 40° C. Overall conversion to polymer was found to be about 93%. The graft copolymer was found to be swollen by, but insoluble in, acetone and dimethylformamide. Analysis of the isolated polymer showed a moisture content of 0.24% and a nitrogen content of 15.02%.

*Example X*

One hundred ml. of the dispersion of the 80/20 beta-methoxyethyl acrylate/acrylonitrile←acrylonitrile (50:50) graft copolymer from Example IX was mixed with 100 ml. of a 1% solution of sodium alignate. The modified dispersion was filtered through a sand pack and extruded under a pressure of 6.5 p. s. i. through a spinneret containing five 0.008" holes. The sodium alginate was coagulated after one foot of travel through a bath containing 2% calcium thiocyanate. The gel fiber was transferred to a 56% aqueous solution of calcium thiocyanate heated to 90° C. This coalesced the polymer particles in the separate filaments. After three feet of travel through this bath, the fiber was washed in ice water and wound up at aproximately eight yards per minute. Yarn drawn approximately 9× over a bar heated to 165° C. had a tenacity of 2.5 grams per denier.

*Example XI*

Two hundred parts of water and two parts of sodium "Lorol" sulfate were charged to the reactor. The reactor was purged with nitrogen, and 0.10 part of ammonium persulfate and 0.05 part of sodium metabisulfite were added. This mixture was heated to 40° C., and 40 parts of acrylonitrile was charged to the well-stirred solution. Polymerization of the acrylonitrile was complete at the end of 6 hours. Ten parts of ethylene bis-methacrylate was added to the dispersion. Polymerization was continued for another 14.5 hours at 40° C. At the end of that time all of the ethylene bis-methacrylate had polymerized and a stable dispersion containing approximately 20% solids was obtained. The isolated copolymer was swollen by dimethylformamide but was not soluble in it.

*Example XII*

Seventy ml. of the dispersion of the acrylonitrile←ethylene bis-methacrylate (80:20) graft copolymer from Example XI was mixed with 70 ml. of a 1% solution of sodium alginate. The modified dispersion was filtered through sand and extruded through an 0.008" orifice in a one-hole spinneret into a 2% solution of calcium thiocyanate. After one foot of travel through this bath, the gel fiber was transferred to a bath containing a 56% solution of calcium thiocyanate heated to 110° C. After five feet of travel through this bath, the polymer particles had coalesced to form a continuous filament. This filament was washed in ice water and wound up at a rate of 9.5 yards per minute.

The partially dried yarn was drawn over a bar heated to about 165° C. to approximately 12 times its original length. Even higher draw ratios were obtainable. This high draw ratio is very unusual for a copolymer which contains a difunctional cross-linking agent. The drawn filaments were boiled off, dried and conditioned. The following properties were measured: tenacity=5.1 grams per denier, elongation=20%, initial modulus=36 grams per denied, denier=14 and fiber stick temperature=219° C.

*Example XIII*

One hundred twenty parts of water and four parts of sodium "Lorol" sulfate were charged to a reactor. The system was purged with nitrogen, and 0.10 part of ammonium persulfate and 0.05 part of sodium metabisulfite were added. This mixture was heated to 40.5° C. and 10 parts of vinylidene chloride and five parts of acrylonitrile were added to the well-stirred solution. The copolymer formed was ready for the further polymerization after five hours at this temperature. A mixture of 10 parts of vinylidene chloride and 11 parts of acrylonitrile was then added to this dispersion, and polymerization was continued for seven hours at 40.5° C. Analysis of a portion of the stable dispersion obtained showed that it contained 18.6% solids. The isolated polymer was found to contain 36.4% chlorine, which corresponds to an overall composition of 50% polyvinylidene chloride and 50% polyacrylonitrile.

*Example XIV*

A portion of the dispersion of the vinylidene chloride/acrylonitrile←vinylidene chloride/acrylonitrile (50:50) copolymer from Example XIII was mixed with an equal volume of a 1% solution of sodium alginate. The modified dispersion was filtered through sand and extruded from a one-hole spinneret into a 2% solution of calcium thiocyanate. After one foot of travel through this bath, the gel fiber was transferred to a bath containing a 56% solution of calcium thiocyanate heated to 105° C. The coalesced filament was washed in ice water and was subsequently drawn 15× at 121° C.

The drawn filaments were boiled off, dried and conditioned. The following properties were measured: tenacity=3.8 grams per denier, elongation=20%, initial modulus=36 grams per denier, denier=12 and fiber stick temperature=183° C. The fiber stick temperature of a filament prepared from a random copolymer of the same composition is approximately 150° C.

*Example XV*

One hundred twenty parts of water and four parts of sodium "Lorol" sulfate were charged to a reactor. The system was purged with nitrogen, and 0.10 part of ammonium persulfate and 0.05 part of sodium metabisulfite were added. The mixture was heated to 40.5° C., and 14.2 parts of vinylidene chloride was added to the well-stirred solution. Polymerization of the vinylidene chloride was continued for five hours at 40.5° C. At the end of this time 21.2 parts of acrylonitrile was added, and polymerization was continued for two hours at 40.5° C. The polymer isolated from the stable dispersion was found to contain 18.6% chlorine.

*Example XVI*

The remainder of the dispersion of the polyvinylidene chloride←polyacrylonitrile (25:75) graft copolymer of Example XV was mixed with an equal volume of a 1% solution of sodium alginate. The modified dispersion was filtered through sand and extruded from a one-hole spinneret into a 2% solution of calcium thiocyanate. After one foot of travel through this bath, the gel fiber was transferred to a bath containing a 56% solution of calcium thiocyanate heated to 102° C. The coalesced filament was washed in ice water and was subsequently drawn 13.5× at 165° C. The drawn filaments were boiled off, dried and conditioned. The following properties were measured: tenacity=6.2 grams per denier, elongation=18%, initial modulus=58 grams per denier and denier=14.

*Example XVII*

The purpose of this example is to compare a random copolymer with a corresponding graft copolymer, specifically that of Example II.

One hundred sixty parts of water, 1.5 parts of sodium "Lorol" sulfate, and 1.5 parts of Pluronic F–68 were charged to a reactor. The system was purged with nitrogen, and 0.2 part of ammonium persulfate and 0.1 part of sodium metabisulfite were added. The mixture was heated to 49° C., and 20 parts of vinyl acetate was added to the well-stirred solution. Addition of acrylonitrile was started immediately, so that polymerization of both monomers was occuring simultaneously; a total of 20 parts of acrylonitrile was added during the course of one hour. Because of the more rapid polymerization rate of acrylonitrile, it was necessary to combine these two constituents in this manner to insure the formation of a random copolymer. The stable dispersion obtained after polymerization was found to contain 18% solids. The isolated polymer was found to contain 16.7% nitrogen.

The remainder of the dispersion of the 37/63 vinyl acetate/acrylonitrile random copolymer was mixed with an equal volume of a 1% solution of sodium alginate. The modified dispersion was filtered through a sand pack and extruded through a one-hole spinneret into a 2% solution of calcium thiocyanate. After one foot of travel through this bath, the gel fiber was transferred to a bath containing a 56% solution of calcium thiocyanate heated to 110° C. The coalesced filament was washed in ice water and was subsequently drawn 9X at 93° C. The dried and conditioned filaments had a fiber stick temperature of 101° C. The filaments shrank 80% upon being immersed for five minutes in boiling water. Because of this high shrinkage, it was not possible to measure the tensile properties of the boiled-off filament. The advantages of this invention are illustrated strikingly by comparing these results with those obtained in Example II.

*Example XVIII*

The following ingredients were charged to a reactor: 160 parts water, 0.2 part ammonium perfluorocaprylate, 0.1 part sodium metabisulfite and 20 parts methyl acrylate.

The reaction mixture was heated to 40° C. and polymerization was continued at that temperature with adequate stirring for three hours. Following this the dispersion was evacuated to remove the last traces of unpolymerized shaker tube and 0.2 part of ammonium persulfate and 0.1 part of sodium metabisulfite were added. The tube was evacuated, flushed with nitrogen, and tetrafluoroethylene was admitted at 400 p. s. i. The tube was then heated at 40–50° C. for four hours. At the end of this time the pressure had dropped to approximately 200 p. s. i. The residual tetrafluoroethylene was released and the polymer collected. The composition of the polymer was found to be poly(methyl acrylate)←polyetrafluoroethylene (20:80). Tough translucent films could be prepared from this polymer.

*Example XIX*

The following ingredients were charged to a reactor: 320 parts water, 3 parts sodium "Lorol" sulfate, 0.4 part ammonium persulfate, 0.2 part sodium metabisulfite and 28 parts methyl acrylate.

The reaction mixture was heated to 40° C. and polymerization continued at that temperature with adequate stirring for 2.5 hours. Vinylidene chloride (52 parts) was the added to the stable dispersion and polymerization continued at 40° C. for six hours. On the basis of the solids content, the yield of polymer was quantitative.

A portion of the polymer was isolated from the dispersion in the usual manner and the following solubility properties observed: It was soluble in tetramethylurea, dimethylformamide and cyclohexanone and insoluble in, but swollen by, dioxan.

The dispersion could be spun directly as was done in the preceding examples, using sodium alignate as the matrix-forming material and tetramethylurea as a coalescing agent.

The term "graft copolymer" is used in the specification and claims to designate a particular type of ordered copolymer in which chains of a given polymer composition are attached at various points to a backbone or base chain of a different polymer composition. They are usually prepared by carrying out the polymerization in a stepwise fashion. The first monomeric constituent is polymerized to form the backbone or main polymer chain. After the polymerization of the first monomer is substantially at an end, but while the polymer formed is in the nascent state, the second monomer is added and polymerized. The first polymer is still active, that is polymerizable, even though all of the first monomer has disappeared. When the second monomer composition is added, polymerization is thought to be initiated at active centers remaining in the pre-formed polymer. Thus, the second polymer chain is grafted onto the first; hence the term "graft" copolymers.

It is not necessary that either the backbone or the bonded chain be a homopolymer. Either the first, or the second, or both, of the two monomer compositions may be a mixture of monomeric materials, as is shown in the examples. It is also not necessary that this be limited to a two-step process. Theoretically, there is no reason why a third monomeric constituent cannot be added after polymerization of the second is complete. However, from a practical standpoint, this is seldom done because of the experimental difficulties encountered in attempting to prepare a uniform product.

The time to add the second constituent varies widely, depending upon the nature of the first monomer and the reaction conditions such as temperature and catalyst. Generally, the polymerization of vinyl monomers as described above is substantially complete in about five hours, and the number of active centers remaining decreases quite rapidly after that time. In some cases the optimum times are shorter, being of the order of two or three hours. The times given here are based on polymerizing at temperatures below 50° C. using redox catalysts. The active centers are destroyed more rapidly at higher temperatures, and the optimum period for adding succeeding monomers will be proportionally shorter. Any catalyst generally used for vinyl polymerizations, e. g., redox and azo catalysts, as, for example, those disclosed in U. S. 2,471,959 and U. S. 2,491,471, may be used in this process. The persulfate-bisulfite system has been found to be particularly effective for preparing the dispersions of this invention.

For monomers which polymerize rapidly, the time at which the succeeding monomer is added is more critical. This is also true for certain catalysts which produce active centers with short lives. Consequently, it is quite difficult to prepare chemically bonded graft copolymers with certain combinations of monomers and catalysts. As has been indicated earlier, this is also true if the first polymerization is allowed to continue too long. However, using the preferred conditions which have been described, the dispersed polymer particle still serves as the point for initiating the second polymerization since there are so few free micelles left in which polymerization to prepare homopolymer can start. Under these circumstances there is usually obtained a modified polymer particle in which the second monomer has formed a polymeric coating on the first polymer particle. These coated polymers possess many of the advantages of the preferred polymers of this invention. However, there are indications that the bonding forces are physical rather than chemical. Despite this fact, it is difficult or impossible to separate the two polymers by selective solvent extraction. These polymers can also be extruded under the conditions described on the following pages to produce products which are frequently difficult to distinguish from those prepared from true graft copolymers. It is true here, as with graft copolymers, that the properties are quite different from those obtained by extruding a dispersion prepared by mixing dispersions of the homopolymers prepared in separate vessels. The properties are also different from those of articles prepared by extruding dispersions prepared by polymerizing the two monomers in the same vessel under conditions such that graft copolymers are not formed.

From the above examples it can be seen that a wide variety of unsaturated compounds may be used in this invention. These include those containing vinyl, vinylene or vinylidene groups as well as corresponding groups in which halogen atoms replace each or some of the hydrogen atoms. One of the most frequently used monomers is acrylonitrile and this monomer may be used in conjunction with such monomers referred to in U. S. Patents Nos. 2,404,714–2,404,727. Useful are such monomers, as styrene, methyl vinyl ketone, esters of methacrylic and acrylic acids, vinyl halides and vinylidene halides, such as vinyl chloride, vinyl fluoride chloride, vinylidene fluoride, vinyl chloride, vinylidene chlorofluoride, vinylidene cyanide, butadiene, isobutylene, the vinyl pyridines, acrylamide, N-mono- and di-substituted acrylic amides, vinyl ethers and the like. Thus monomers containing more than one ethylene double bond, such as in divinylbenzene, may be employed. Cross-linking can be tolerated because the dispersion shaping process does not require great solubility in the polymers being shaped. However, for the most part linear polymers are produced by this invention and such polymers are generally preferred.

The polymers prepared by this invention are readily shaped into filaments, films, ribbons, rods, bristles, tubes and similar articles.

The preferred copolymers are those which are prepared under conditions such that a stable dispersion is maintained throughout the process. In other words, the first monomer composition is dispersed in the polymerization medium, which is usually aqueous, and polymerized under conditions such that a stable emulsion or dispersion of the polymer is obtained. When polymerization of the first monomer is complete and the polymer is in the nascent state, the second monomer composition is added and polymerized to produce a stable emulsion or dispersion of the copolymer. When preparing bonded copolymers by this method, it is essential that no emulsifying agent or soap be added with the second monomer composition if a true graft copolymer which is free of homopolymer is to be obtained. It is customary to add all of the emulsifying or dispersing agent prior to the first monomer composition. It is also preferred not to add any additional catalyst or activator along with the second monomer composition. Control of these components is not as critical as is control of the soap micelle concentration, but it is desirable to add all of the catalyst and activator prior to the start of the polymerization to minimize contamination of the copolymer with homopolymer.

It has been recognized that shaped articles, such as fibers and films, prepared from the copolymers of this invention are different from comparable shaped articles prepared from mixtures of polymers and from random copolymers of the same monomers. This is true even when the shaped articles are prepared by processes known to the art. However, it is impossible to utilize all of the unique properties of these new copolymers by use of the usual solution or melt processes. The copolymers of this invention appear to have very high molecular weights on the basis of solubility behavior; they are not readily dissolved by solvents for either of the homopolymers, and the viscosity of solutions containing only small amounts of the polymers is quite high. Consequently, it has not been possible to prepare fibers from solutions of these polymers under the conditions normally used for preparing fibers by solution methods. However, some indication of the difference in the properties of shaped articles has been measured with films prepared from these dilute solutions and films prepared as described in the following paragraph.

Fifty ml. of the dispersion of polyvinyl acetate—polyacrylonitrile prepared in Example VI was mixed with 50 ml. of a 1% solution of sodium alignate. The modified dispersion was spread on a film casting plate with a 20 mil doctor knife. The plate was immersed in a 4% aqueous calcium thiocyanate solution. After five minutes the plate was transferred to a 56% aqueous calcium thiocyanate solution heated to 90° C. After approximately ten minutes the plate was transferred to a room temperature water bath. The film was then removed from the plate, washed thoroughly with water, and dried at 50° C. Strips of film drawn 6× were immersed in boiling water for five minutes. The average shrinkage was 8.4%.

Eleven grams of the dry, powdered polymer obtained above was dissolved in 190 grams of dimethylformamide to produce a clear viscous solution. Films were cast from the solution using a 20 mil doctor knife. The films were dried at 50° C. The dried films drawn 6× were immersed in boiling water for five minutes. The average shrinkage was 22.6%. Thus, the articles shaped by the process of this invention had, by far, the lower shrinkage.

Thus, the new process of this invention produces products which are different from, and superior to, those which have been described previously and better than those prepared from the same products by the conventional processes. In this process a matrix-forming material is incorporated in the aqueous dispersion of the copolymer. The modified dispersion is shaped by extruding it through an orifice into a setting medium. The gel structure obtained on setting comprises the substantially immobilized discrete polymer particles imbedded in the coagulated matrix-material. These polymer particles are coalesced or fused without destroying the shape of the extruded article. The shaped article will thus comprise a continuous phase of the graft copolymer together with minor quantities of the matrix-forming material.

The matrix-forming material comprises a cationic or anionic polymeric electrolyte or a neutral polymeric material which is soluble in the dispersion of the graft copolymer and which can be precipitated. While most materials used to form the matrix or supporting structure are fiber-forming, it is not essential that they be initially fiber-forming. Materials which are not of themselves fiber-forming, but which upon extrusion into a setting medium are formed into fibers, can be used.

Suitable anionic, polymeric materials contain a plurality of acidic groups, such as carboxyl, sulfonic, and/or phosphoric or other acid groups. As specific examples may be mentioned: alginates, carboxyalkyl celluloses, carboxymethylhydroxyethyl celluloses, pectinates, pectates, polyacrylates, polymethacrylates, beta-carboxyethylmethacrylate polymer, beta-carboxyethylacrylate polymer, water-soluble modified styrene polymer resins, partially hydrolyzed polyacrylamide, copolymers of acrylic and methacrylic acids and the like.

Cationic, polymeric electrolytes suitable as matrix-forming materials contain a plurality of basic groups, usually amino and/or quaternary ammonium groups. Examples of useful cationic, polymeric electrolytes are diethylaminoethyl methacrylate polymer; hydrolyzed vinyl acetate copolymers with a vinyl pyridine, N-vinyl phthalimide, dimethylaminoethyl vinyl ether, and N-(2-vinyloxyethyl) formamide; other vinyl substituted amino and masked amino polymers; and quaternary ammonium compounds, such as poly(beta-methacrylyloxymethyl-trimethylammonium bromide) and the quaternary ammonium salts from the reaction of alkyl halides with polyvinyl pyridine.

Neutral polymers which may be used as matrix-forming materials include methyl cellulose, hydroxyethyl cellulose, cellulose acetate, cyanoethyl cellulose, polyacrylamide and polyvinyl alcohol.

Only small amounts of matrix-forming material are required to provide a definite advantage. The quantity used ranges from 0.10% to 10% by weight of the dispersion, with 0.25% to 5% being preferred. The specific quantity preferred varies with the matrix material.

The mixing operation may be carried out in any one of a number of ways. For instance, the finely divided dry polymer may be added to a solution of the matrix-forming material or the dry polymeric matrix-forming material may be added to an aqueous dispersion or emulsion of the polymer. It is also possible that the dry polymer and dry matrix-forming material may be mixed and simultaneously incorporated in an aqueous medium. A preferred method is to mix a water solution of the matrix-forming material with an aqueous dispersion of the polymer.

Modified dispersions containing the matrix-forming material are flowable, especially when the polymer concentration is less than about 60% by weight. Shaped objects are prepared from these dispersions, which preferably contain from 5–60% by weight of the polymer, by extruding through a shaped orifice into a precipitating or immobilizing medium. During this first stage of the process, Brownian motion of the polymer particles practically stops and the matrix forms a gel-like structure which supports the particles. The precipitated matrix is water-insoluble and possesses a fair degree of wet strength. The choice of matrix-forming material will depend to some extent on the dispersed copolymer. It is obvious that one will use a matrix-forming material which will not coagulate the polymer in the dispersion prior to shaping.

The setting or immobilizing medium may be any fluid capable of precipitating or gelling the matrix-forming material. Included are air and compounds such as volatile strong acids, and aqueous solutions of inorganic compounds and water-miscible organic compounds. Preferably, an aqueous solution containing a low concentration of the precipitating agent is employed. In all cases, precipitation is practically instantaneous, the time required being of the order of 0.04 second.

Aqueous solutions of polyvalent metal salts are particularly useful as precipitants when an anionic matrix-forming material is used. Solutions containing from 0.5 to 40% by weight of the following salts are suitable precipitating agents: calcium thiocyanate, aluminum sulfate, potassium aluminum sulfate, barium thiocyanate, zinc chloride, magnesium bromide, calcium iodide and chromous nitrate. Soluble sulfates, di- and poly-sulfonic acids and their salts in aqueous solution are suitable precipitants for use when the matrix-forming material is a cationic material. The following compositions have been used as setting media for non-ionic matrix-forming materials: 50% aqueous ammonium sulfate, 40% aqueous calcium chloride, 30% aqueous aluminum sulfate and 50% aqueous ammonium acetate. Many materials, such as alginic acid, are insoluble in water but are soluble as salts or in bases; and aqueous solutions of acids such as hydrochloric, sulfuric and sulfamic acids can be used as precipitants. Similarly, matrix-forming materials which are soluble in acids, but insoluble in water, may be precipitated by use of bases.

In the second stage of the process, the substantially immobilized water-insoluble polymer particles coalesce or flow together, without destruction of the formed article. Coalescence is achieved in various ways, the preferred method for any one polymer depending upon the polymer itself. The modified polymer dispersion may be extruded into a setting medium which will precipitate the matrix-forming material but which exerts little or no solubilizing action on the polymer particles. Thereafter the shaped structure is exposed to the coalescing action of an agent which is capable of dissolving the polymer. In most cases this has been found to be the preferred method of operation. However, it is possible to extrude the polymer dispersion into a liquid medium which will precipitate the matrix-forming material and will also exert solvent action on the polymer particles in the precipitated matrix.

The exposure to this coalescing action of the solvent may be accomplished by passing the coagulated structure through such a solvent or by air drying the shaped article which has occluded minor amounts of a solvent. In any case, the time of exposure to the solvent action is so regulated that the particles coalesce without destroying the shaped structure.

The polymer particles in the shaped article may be coalesced with the aid of organic liquids or concentrated aqueous solutions of salts and mineral acids. For a low cost, ease of handling and safety in use, aqueous salt solutions are generally preferred for coalescing. The water-soluble salts used for preparing the solutions are preferably metal salts of inorganic acids. The salts should be sufficiently soluble in water to yield 10% solutions, and preferably, at least 30% solutions. Furthermore, concentrated aqueous solutions of the salt being used should be capable of dissolving the polymer component being coalesced at some temperature up to the boiling point of the salt solution.

Organic compounds which are to be used as coalescing agents should, preferably, be capable of dissolving the polymer constituent at temperatures below their boiling points. However temperatures higher than the boiling point of the liquid may be used by conducting the process in the vapor phase or under pressure. Organic compounds suitable for coalescing polymers include dimethylformamide, dimethylacetamide, m-cresol, methyl ethyl ketone, tetramethylurea, adiponitrile, cyclohexanone, acetophenone and mesityl oxide.

Certain salt solutions have a specific solubilizing action on some polymers and will coalesce the bonded copolymers containing a sufficiently high percentage of these constituents. For example, salts which are highly useful in coalescing acrylonitrile graft copolymers include the following: lithium thiocyanate, lithium iodide, lithium bromide, sodium thiocyanate, sodium iodide, potassium thiocyanate, magnesium thiocyanate, calcium thiocyanate, calcium iodide, calcium bromide, manganese thiocyanate, zinc thiocyanate, cadmium iodide, and the chlorides, bromides, and iodides of zinc, tin, iron and cobalt. Suitable organic liquids include dimethylformamide, m-cresol, xylene, methyl ethyl ketone, tetramethylurea and adiponitrile. In coalescing the polymer particles, room temperatures or lower can be used, but it is generally preferred that the coalescing bath be heated, since less time is needed.

Removal of the coalescing agent from the shaped polymer is readily effected by washing. In washing multifilaments, it is generally preferred that cold water be used. The resulting structure may then be after-treated with boiling water and, if desired, stretched to orient the molecules to effect improvement in physical properties. On the other hand, the coalesced structure may be partially or completely oriented by drawing prior to the washing step.

In addition to water, matrix-forming material and polymer, the dispersion used for producing the shaped articles can contain dispersing agents, plasticizers, pigments, dyes, clay, silica, alcohol, acetone and similar materials. Alternatively, these materials may be incorporated in the coagulating bath, in the coalescing bath or in separate baths or a combination of these. These substances may or may not appear in the final shaped articles. If desired, the coagulated articles may be passed through a bath between the coagulating and coalescing media for washing, filling, plasticization and the like prior to coalescing.

The shaping process of this invention can, of course, also be applied readily to graft copolymers prepared by previously known methods. Regardless of the source of graft copolymer, it is possible to prepare by this method shaped articles with unique properties. A particular advantage is realized when utilizing the previously described, preferred graft copolymers, i. e., those prepared under conditions where a stable dispersion is maintained throughout the process and where no soap is added along with the second monomer composition. The polymer which is being coalesced may be present as the first or second component of the graft copolymer, or it may be present in both components. For generally simpler operations it is preferred that the polymer which is being coalesced be present in the second component of the graft copolymer. In order to obtain a shaped structure having tensile properties approximating those of a shaped structure prepared in a similar manner from the homopolymer of the constituent being coalesced, it is required that either the first or the second component contain at least 40% of the polymer for which the coalescing agent has been selected. For practical reasons it is preferred that the graft copolymer has no more than four monomeric constituents and that the constituent which is to govern the tensile properties of the ultimate shaped structure comprise a least 40% of the total weight of the monomers.

The graft copolymers which contain acrylonitrile are a preferred species of this invention. Of these copolymers those which contain at least 60% by weight polyacrylonitrile are preferred, since they possess tensile properties which are substantially equivalent to those of an acrylonitrile homopolymer prepared and processed in a similar manner. The added constituents are selected and combined to obtain the desired modification in properties other than tensile properties. For example, the dyeability, drawability, glazing temperature, fiber stick temperature, flammability, hydrophilicity and many other properties can be modified while still retaining substantially all of the desirable tensile properties of acrylonitrile homopolymers. Shaped articles prepared from graft copolymers by this process possess a combination of properties which cannot be obtained in any other way. For example control of the elasticity and tackiness of articles prepared from synthetic elastomer compositions is possible. As a specified example of this type of application, a graft copolymer was formed in which the first component was a 70/30 copolymer of chloroprene and acrylonitrile, and the second component was polyacrylonitrile. The film prepared from this dispersion was clear and elastic but not tacky. Also, it was found that the abrasion resistance of fibers prepared from acrylonitrile polymers would be improved by use of graft copolymers in which the first component was polyacrylonitrile and the second component was a softer polymer, such as poly(ethyl acrylate) and poly(vinyl acetate).

Another particular advantage of this process is that polymers of high molecular weight may be readily utilized. The preparation of filaments from solutions of the high molecular weight copolymers generally obtained in this process would be impractical because solutions containing commercially useful concentrations of polymer have viscosities which are too high to be processed under reasonable conditions. However, in the process of this invention the viscosity of the dispersions is independent of the molecular weight, so that there is no upper limit to the molecular weight of the polymers which can be utilized.

The dispersions can be, and preferably are, quite concentrated with respect to the amount of polymer present. A further advantage of the process is that isolation of the polymer is not required, since they are prepared and utilized in the form of aqueous dispersions. Finally, the temperatures employed in this process are generally low, in the vicinity of room temperature, and, if high temperatures are needed, only short exposure periods are required. As a result, the products are not discolored during formation and are essentially white.

Any departure from the above description which conforms to the present invention is intended to be included within the scope of the claims.

I claim:

1. The process of preparing filaments which comprises forming a dispersion of a polymer in particulate form by polymerizing an ethylenically unsaturated monomer in an aqueous medium, adding to the said dispersion after polymerization of the monomer is substantially complete but while the resultant polymer is still in the nascent state, a second ethylenically unsaturated monomer to obtain a particulate dispersion of a copolymer of the two said monomers, adding to the resultant dispersion a settable matrix-forming material which is soluble in the said dispersion, extruding the dispersion through a spinneret into a medium which precipitates the said matrix-forming material by rendering it insoluble, and thereafter coalescing the particles of the copolymer embedded in the matrix-forming material by contacting the same with a fluid which has a solvent action on the copolymer particles.

2. The process of claim 1 in which the copolymer has an acrylonitrile content of at least 60% by weight.

3. The process of claim 1 in which the second monomer is added without the addition of further emulsifying agent.

4. The process of claim 1 in which the said fluid is a liquid.

5. The process of claim 1 in which the matrix-forming material is added in the amount of from about 0.10% to about 10% by weight of the dispersion.

6. The process of claim 5 in which the percentage is from about 0.25% to about 5%.

7. The process of claim 5 in which the dispersion contains from about 5% to about 60% by weight of the said copolymer.

References Cited in the file of this patent

UNITED STATES PATENTS

| | | |
|---|---|---|
| 2,460,300 | Le Fevre et al. | Feb. 1, 1949 |
| 2,649,434 | Coover et al. | Aug. 18, 1953 |
| 2,657,191 | Coover et al. | Oct. 27, 1953 |
| 2,666,025 | Nozaki | Jan. 12, 1954 |
| 2,666,042 | Nozaki | Jan. 12, 1954 |

FOREIGN PATENTS

| | | |
|---|---|---|
| 678,943 | Great Britain | Sept. 10, 1952 |
| 690,937 | Great Britain | Apr. 29, 1953 |
| 694,408 | Great Britain | July 29, 1953 |

UNITED STATES PATENT OFFICE

CERTIFICATE OF CORRECTION

Patent No. 2,840,447

June 24, 1958

Duane L. Green

It is hereby certified that error appears in the printed specification of the above numbered patent requiring correction and that the said Letters Patent should read as corrected below.

Column 4, line 66, for "p p. s. i." read -- 6 p. s. i. --; column 7, line 52, after "unpolymerized" insert -- monomer. The polymer dispersion was transferred to a polymerization --; line 73, for "the", first occurrence, read -- then --; column 9, line 27, after "fluoride" insert --, vinylidene --.

Signed and sealed this 2nd day of September 1958.

(SEAL)
Attest:

KARL H. AXLINE
Attesting Officer

ROBERT C. WATSON
Commissioner of Patents